United States Patent [19]

Petruccello

[11] Patent Number: 5,531,134
[45] Date of Patent: Jul. 2, 1996

[54] REMOTE CONTROL ASSEMBLY HAVING ROTATABLE END FITTING

[75] Inventor: John P. Petruccello, Detroit, Mich.

[73] Assignee: Teleflex, Inc., Plymouth Meeting, Pa.

[21] Appl. No.: 449,304

[22] Filed: May 24, 1995

[51] Int. Cl.⁶ ........................................................ F16C 1/14
[52] U.S. Cl. ............................................................ 74/502.4
[58] Field of Search ................................. 74/502.4–502.6, 74/500.5, 501.5 R

[56] References Cited

U.S. PATENT DOCUMENTS

| | | |
|---|---|---|
| 3,572,159 | 3/1971 | Tschanz . |
| 4,177,691 | 12/1979 | Fillmore . |
| 4,238,974 | 12/1980 | Fawcett . |
| 4,380,178 | 4/1983 | Bennett et al. . |
| 4,458,552 | 7/1984 | Spease et al. . |
| 4,694,706 | 9/1987 | Lichtenberg et al. . |
| 4,726,251 | 2/1988 | Niskanen . |
| 4,860,609 | 8/1989 | Spease ................................. 74/502.4 |
| 5,161,428 | 11/1992 | Petruccello . |
| 5,178,034 | 1/1993 | Reasoner . |
| 5,295,408 | 3/1994 | Nagle et al. . |
| 5,383,377 | 1/1995 | Boike . |

*Primary Examiner*—Charles A. Marmor
*Assistant Examiner*—Mary Ann Battista
*Attorney, Agent, or Firm*—Howard & Howard

[57] ABSTRACT

A motion transmitting remote control assembly has a conduit, a core element, and an end fitting molded about one end of the conduit. The end fitting is generally cylindrical and has a plurality of annular locking grooves and is fitted with an O-ring seal. A connector is molded separately from the end fitting and has snap-lock tabs for attachment to a support structure. A receptacle extends into the connector from one end thereof and is accessible from above through a transverse passage. The end fitting is insertable axially into the receptacle through its open end to support the connector for rotation about the end fitting. The O-ring provides a fluid-tight seal between the end fitting and connector. The end fitting is retained in the receptacle by a locking member having U-shaped locking portions that are extendible through the transverse passage into nesting engagement with the locking grooves of the end fitting to secure the end fitting against removal from the receptacle while retaining the relative rotatability of the connector and end fitting.

11 Claims, 3 Drawing Sheets

1

REMOTE CONTROL ASSEMBLY HAVING ROTATABLE END FITTING

TECHNICAL FIELD

This invention relates to a motion transmitting remote control assembly of the type for transmitting motion in a curved path by flexible motion transmitting core element.

BACKGROUND OF THE INVENTION

Cable control assemblies of the above type typically include a conduit that slideably supports a flexible core element whose opposite ends extend from the ends of the conduit for connection at one end to a controller, such as a gear shift selector for an automotive transmission, and for connection at the opposite end to a remotely located controlled member, such as the shift linkage on the vehicle's transmission.

The ends of the conduit are provided with end fitting assemblies that mount on the vehicle support structure and secure the conduit against longitudinal movement. This enables the core element to transmit the motion of the controller to the controlled member in conventional push-pull manner.

During installation, the conduit has a tendency to become twisted as it is routed along its course and secured to the vehicle structure. The twisting makes it difficult to install the assembly and puts unwanted stress on the conduit, which may impede movement of the core element.

U.S. Pat. No. 5,383,377 in the name of Randy J. Boike, issued Jan. 24, 1995, and commonly owned with the present invention, discloses a cable control assembly having a rotatable end fitting connector which allows the connector to rotate relative to the conduit to eliminate unwanted twisting. An end fitting or ferrule is molded onto one end of the conduit and is fixed against rotation. A connector body is then molded over the end fitting with there being a non-adherent film of material (e.g., PTFE) interposed therebetween so as to allow the overmolded connector to rotate relative to the end fitting and conduit. The connector has an annular recess that is molded about an annular flange of the end fitting that, by its construction prevents the removal of the end fitting from the connector. Because the connector is molded insitu about the end fitting, it is difficult to control the dimensional tolerance between the connector and end fitting that is needed to achieve good, repeatable rotatability of the connector Undersized end fittings inhibit rotation while oversized end fittings provide too loose of a fit.

SUMMARY OF INVENTION AND ADVANTAGES

A motion transmitting remote control assembly constructed according to the present invention comprises a conduit having opposite ends slideably supporting a core element having end portions that extend from the ends of the conduit. An end fitting is secured to one end of the conduit and a connector is disposed about the end fitting having mounting means for mounting the connector to a support structure. The connector includes a receptacle having an access opening therein to receive and support the end fitting rotatably within the receptacle and retaining means acting between the end fitting and connector to retain the end fitting against subsequent removal from the receptacle while maintaining the relative rotatability between the end fitting and the connector. Resilient seal means act between the end fitting and connector upon insertion of the end fitting into the receptacle for providing and maintaining a fluid-tight seal between the end fitting and the connector during their relative rotation.

This invention enables better control of the dimensional tolerance to provide improved rotation between the end fitting and connector by preforming both components separately before assembly, as compared to the overmolded construction. A manufacturer may prefabricate a number of different connector styles ahead of time and then install the appropriate connector on the end fitting for the particular end use. The resilient seal means is able to provide a seal even during relative rotation of the end fitting and connector to protect the core element from exposure to moisture and inclement conditions.

BRIEF DESCRIPTION OF THE DRAWINGS

These and other features and advantages of the invention will become more readily understood and appreciated by those skilled in the art when considered in connection with the following detailed description and drawings, wherein:

FIG. 5 is a view like FIG. 4 but showing the locking member moved to the engaged position.

DETAILED DESCRIPTION

Figure 1:
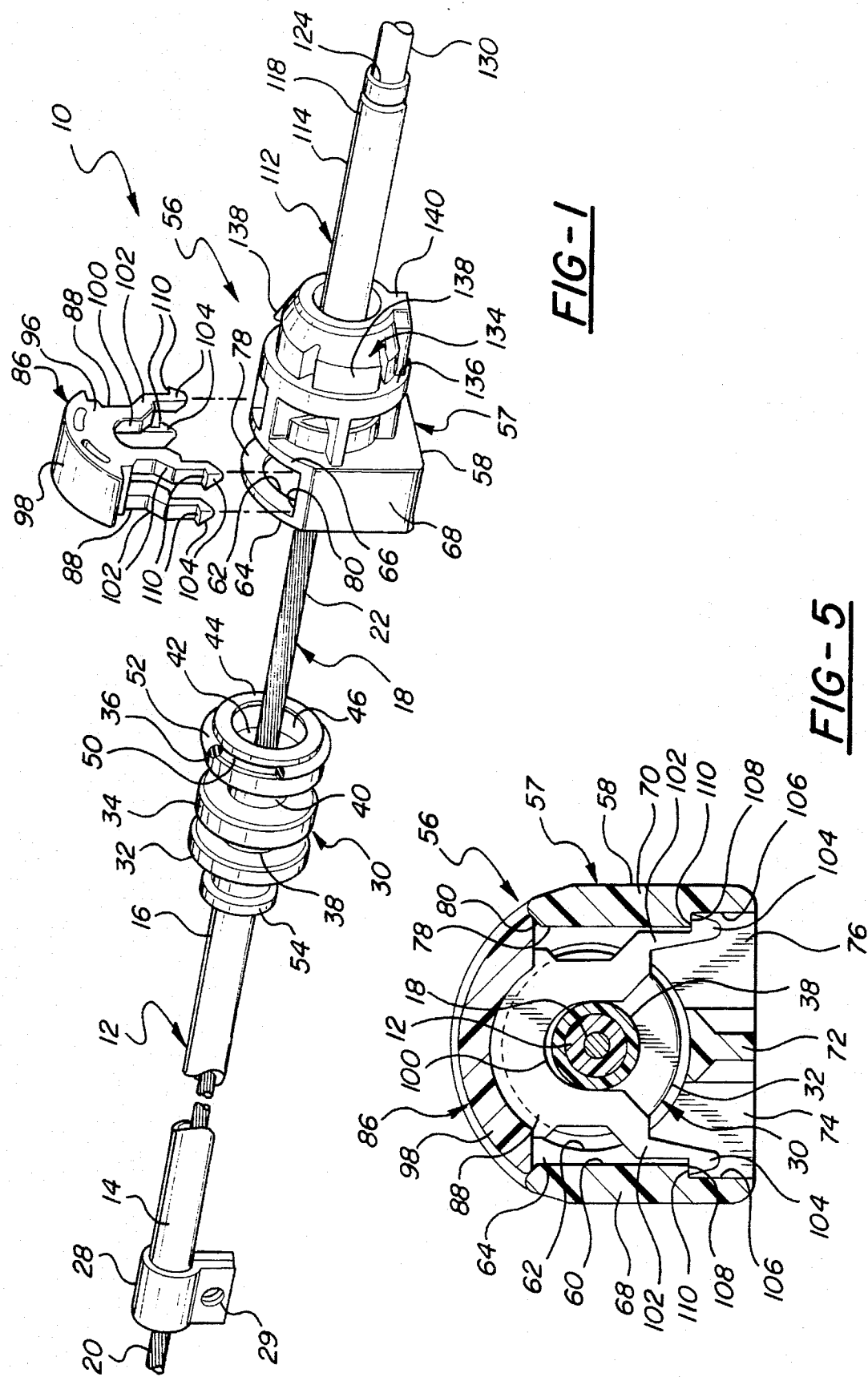
FIG. 1 an exploded fragmentary perspective view of the component parts of the invention.

A motion transmitting remote control assembly constructed according to a presently preferred embodiment of the invention is indicated generally at 10 of the drawings and comprises a flexible conduit 12 extending longitudinally between opposite ends designated at 14 and 16, respectively. The conduit 12 may be of the type well known in the art including a plastic inner tube surrounded by a plurality of helically disposed long lay wires which in turn are surrounded by a plastic outer casing.

A motion transmitting core element 18 is supported slideably within the conduit and has end portions 20, 22 that extend from and beyond the conduit ends 14, 16. The core element 18 may be of the type well known in the art such as a flexible wire or cable. The ends of the core element 18 are provided with suitable connectors (not shown), that enable the core element to be connected at one end to a controller (not shown), such as the gear shift selector mechanism for an automatic transmission, and at the opposite end to a remotely located member to be controlled (not shown), such as the gear shift linkage provided on the transmission.

The conduit 12 is provided at end 14 with a fitting such as that shown at 28 that is adapted by a flange having a hole 29 therein for attachment to support structure of the vehicle (not shown).

A ferrule or end fitting 30 is secured to the other end 16 of the conduit 12 and preferably is insert-molded about the conduit end 16 from rigid organic polymeric material and fixed thereby against either axial or rotational movement relative to the conduit 12. As illustrated best in FIGS. 1 and 2, the end fitting 30 is generally cylindrical in configuration and includes a plurality (preferably three) enlarged annular disk-like projections 32, 34, 36 spaced axially from one another to define therebetween a plurality (preferably two) annular locking grooves or recesses 38, 40. Both the projections 32, 34, 36 and the grooves 38, 40 are arranged concentrically about the longitudinal axis of the conduit 12 and are of uniform diameter. The projection 36 is formed at the forward-most free end of the end fitting 30 and has an end face 42 that extends transversely across and covers the end 16 of the conduit, and an annular ridge 44 projecting axially from the end face 42 beyond the conduit 12 defining a cylindrical recess or pocket 46 in the end of the end fitting 30 forwardly of the conduit end 16. The end face 42 is formed with a central aperture 48 that is aligned with the core passage of the conduit 12 and provides an opening for the passage of the core element 18. The front-most projection 36 is relatively thicker in axial dimension than the other projections 32, 34 and is formed with an outer O-ring groove 50 into which a resilient elastic O-ring 52 of predetermined diameter is fitted.

The end of the fitting 30 opposite the end face 42 is formed with a radial barb 54 over which a sleeve of heat-resistent material (not shown) may be installed to provide a heat shield to the assembly 10.

Figures 2, 4:
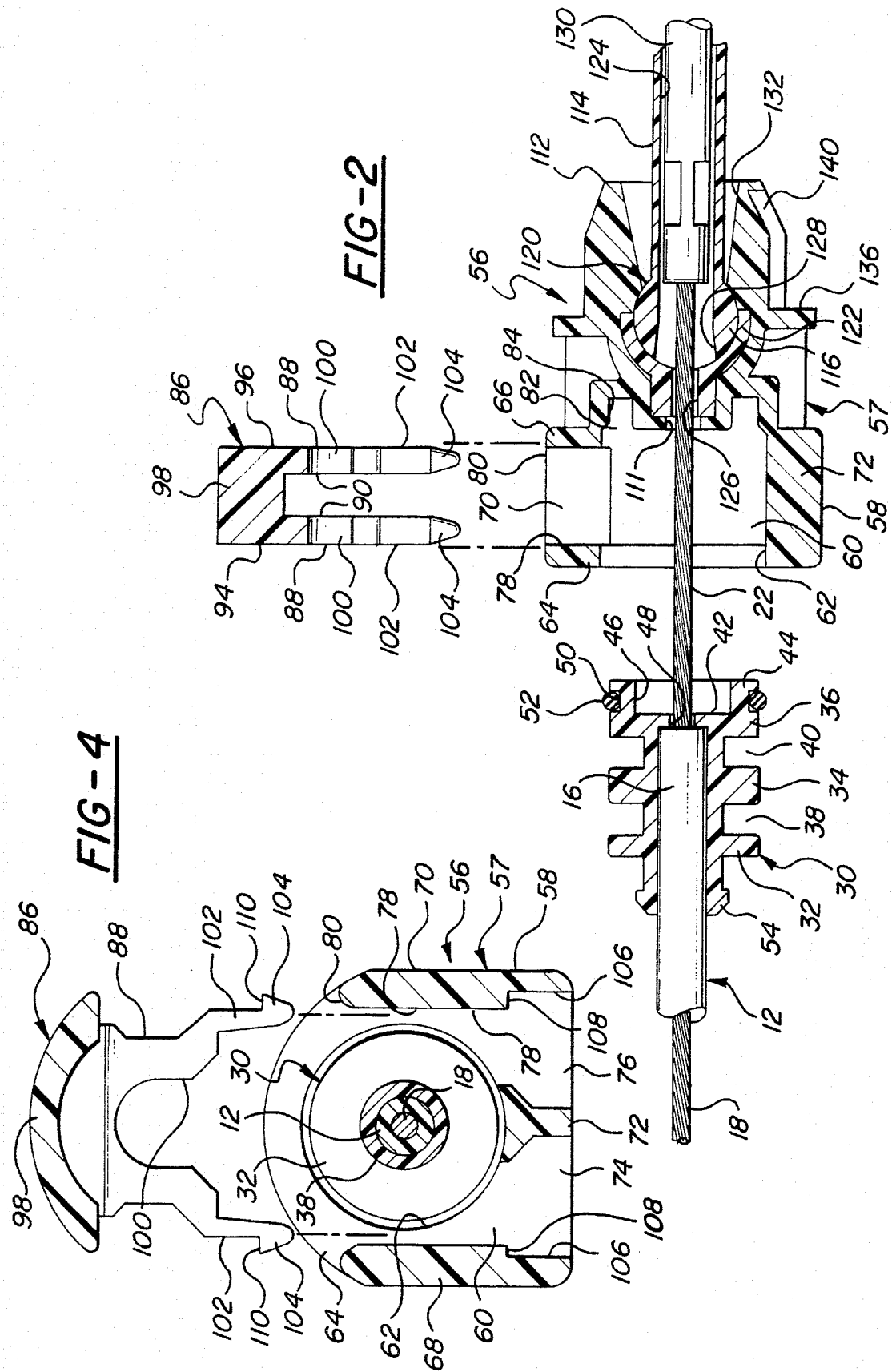
FIG. 2 is a front elevational section view of the components of FIG. 1.
FIG. 4 is a transverse section view taken along lines 4—4 of FIG. 3.

A preformed connector 56 has a molded body 57 that is molded separately from the end fitting 30 from a rigid organic polymeric material and includes a base portion 58 formed with a cavity or receptacle 60 having an access opening 62 extending axially into the receptacle 60 and dimensioned to receive and support the end fitting 30 rotatably within the receptacle 60. The receptacle 60 is formed at one end of the connector 56 and is defined in part by a generally planer transverse end wall 64 and an adjacently spaced transverse back wall 66. The end and back walls 64, 66 are interconnected by a pair of axially extending sidewalls 68, 70 spaced laterally from one another by a distance relatively greater than the diameter of the end fitting 30. An axially extending bottom reinforcement rib 72 also joins the end and back walls 64, 66 at the bottom of the connector 56 and is shown best in FIGS. 4 and 5, is spaced laterally from each of the sidewalls 68, 70 defining a pair of bottom drain openings 74, 76 in the connector 56. The axially spaced end and back walls 64, 66 and the laterally spaced side walls 68, 70 together define a transverse passage 78 having an opening 80 at the top of the connector 56 that is spaced from the access opening 62 and extends therefrom transversely of the connector 56 into the receptacle 60 such that the passage 78 intersects the receptacle 60 at approximately a right angle.

Figure 3:
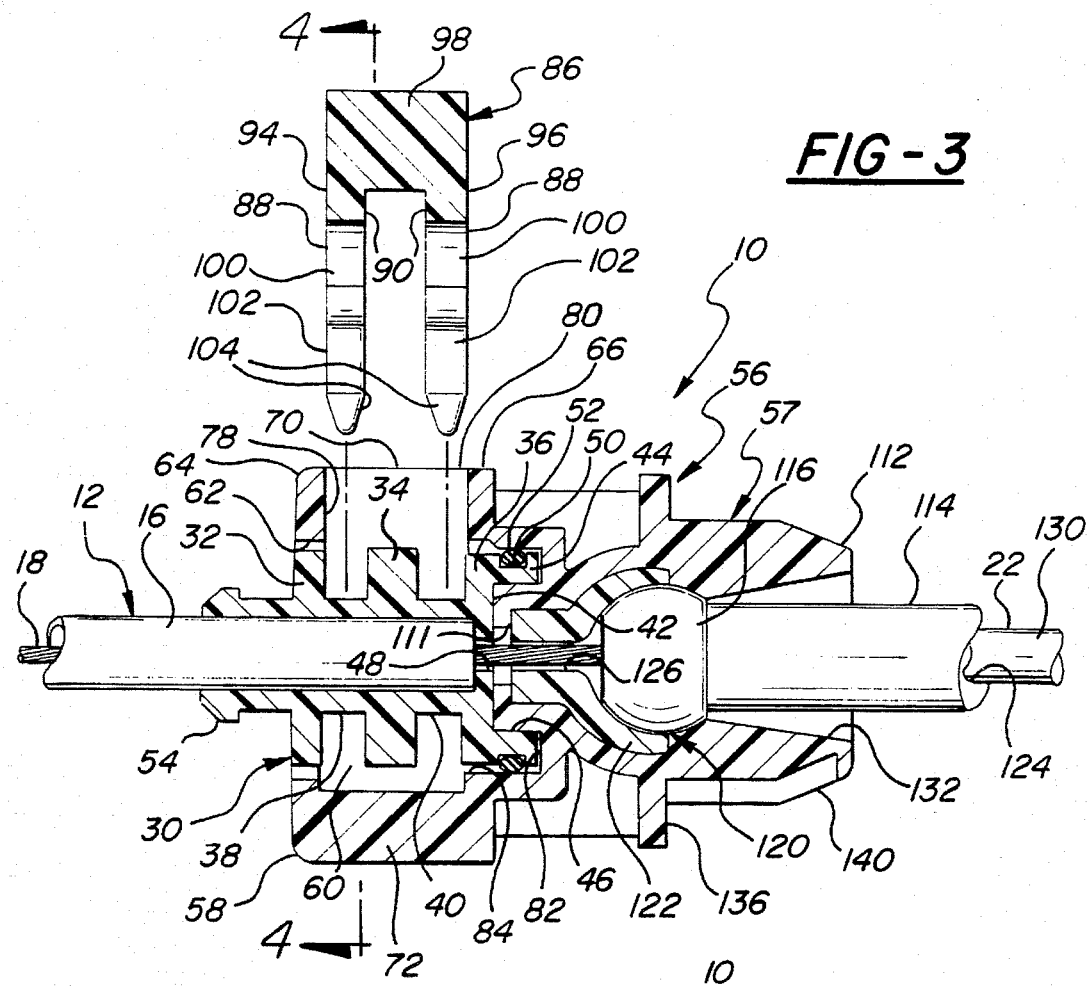
FIG. 3 is a view like FIG. 2 but with the end fitting inserted into the socket of the end fitting.

As seen best in FIGS. 3 and 4, the access opening 62 is provided in the end wall 64 and has a generally circular configuration corresponding to the cross-sectional shape of the end fitting 30. The opening 62 is sized large enough to allow the end fitting 30 to pass axially through the opening 62 and into the receptacle 60, as illustrated by a comparison of FIGS. 2 and 6. Preferably, the opening 62 is circular and is slightly greater in diameter than the diameter of the annular projections 32, 34, 36. The back wall 66 of the base portion 58 is formed with an axially concentric annular depression or recess 82 dimensioned to receive and support the annular ridge 44 of the end fitting 30 therein and being relatively smaller in diameter than the O-ring 52 to radially deform or compress the O-ring 52 between the radially outer wall 84 of the recess 82 and the bottom of the O-ring groove 50 upon insertion of the end fitting 30 fully into the receptacle 60, to perfect and maintain a fluid-tight seal between the end fitting 30 and the connector 56 while at the same time permitting the connector 56 to rotate about the end fitting 30.

Figure 6:
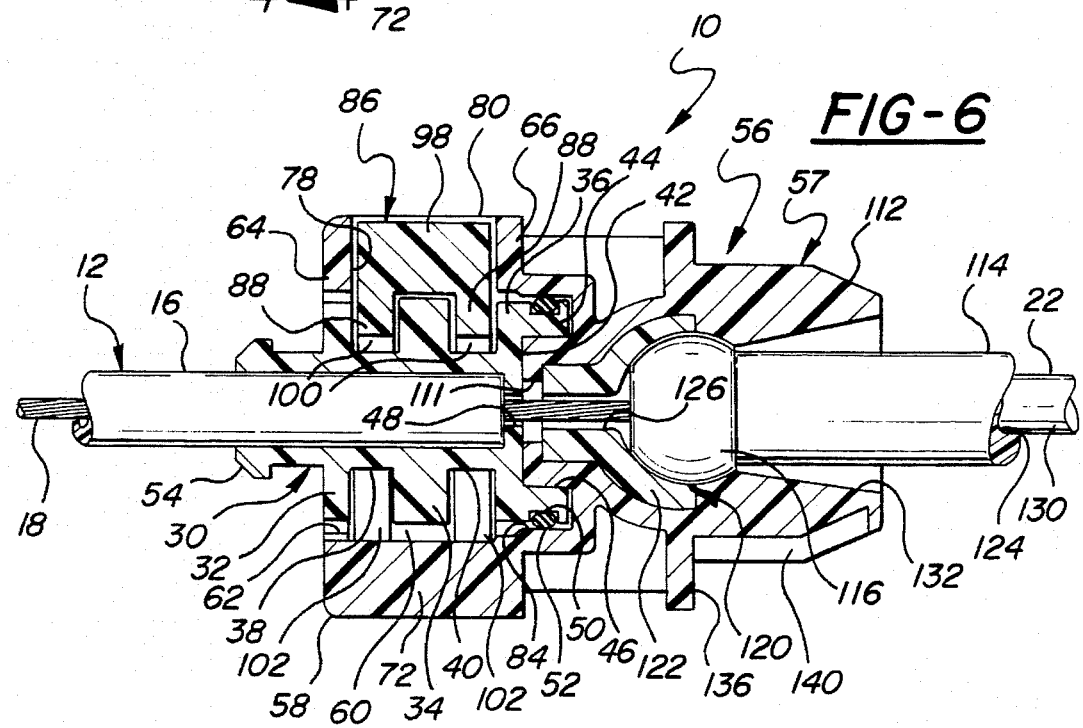
FIG. 6 is a view like FIG. 3 but with the locking member moved to the engaged position.

The axial spacing between the recess 82 and the access opening 62 is generally equal to the axial spacing between the front-most projection 36 and the back-most projection 32 such that when the end fitting 30 is inserted fully into the receptacle 60, the back-most projection 32 is supported within the access opening 62 as illustrated in FIGS. 3 and 6. As shown in FIG. 4, it is preferred that the opening 62 be relatively larger in diameter than the projection 32 so as not to hinder the relative rotation of the connector 56 and end fitting 30. The coplanar alignment of the projection 36 within the opening 62 further serves to provide lateral support to the end fitting 30 by limiting lateral rocking movement of the end fitting 30 within the receptacle 30 in order to assist and maintain the fluid-tight seal at the O-ring 52.

As illustrated in FIG. 3, when the end fitting 30 is inserted fully into the receptacle 60, the annular locking grooves 38, 40 are each aligned with the transverse passage 78 and accessible from the top opening 80 of the passage 78. Retaining means in the preferred form of a locking member 86 is provided for acting between the connector 56 and the inserted end fitting 30 to retain the end fitting 30 against removal from the receptacle 60 while maintaining the relative rotatability between the connector 56 and the end fitting 30.

As illustrated in FIGS. 1 and 3, the locking member 86 includes at least one and preferably a pair of generally U-shaped members 88 having inner adjacent surfaces 90, 92 spaced laterally from one another by a distance at least equal to and preferably slightly greater than the axial thickness of the central annular projection 34 of the end fitting 30 and outer surfaces 94, 96 spaced laterally from one another by a distance generally equal to the axial spacing between the end wall 64 and the back wall 66 of the connector 56. The pair of U-shaped members 88 are joined to one another by a cap 98 that has an axial thickness approximating the axial dimension of the passage 78 and a lateral width that is preferably slightly greater than the lateral dimension of the passage 78 to limit the extension of the locking member 86 into the passage 78.

The U-shaped members 88 include U-shaped, saddle-like locking channels or recesses 100 that are dimensioned and positioned to mesh with the locking grooves 38, 40 of the end fitting 30 when the locking member 86 is moved from a disengaged position (FIGS. 1–4) to an engaged position (FIGS. 5 and 6) upon inserting and extending the locking member 86 fully into the transverse passage 78. When in the engaged position, the locking member 86 confronts and is captured between the transverse end and back walls 64, 66 and thus is unable to be moved to any significant degree axially relative to the connector 56. Further, the U-shaped locking channels 100 are received in and straddle the locking grooves 38, 40 of the end fitting 30 and confront the transverse walls of the annular projections 32, 34, 36 to thereby lock the end fitting 30 in position within the receptacle 60 and prevent relative axial movement between the end fitting 30 and the connector 56. Although the U-shaped locking channels 100 serve to lock the end fitting 30 against relative axial movement within the receptacle 60, they do not restrict the relative rotatability between the connector 56 and end fitting 30.

The locking member 86 and connector 56 have mutually engageable portions that co-act when the locking member 86 is inserted fully into the passage to retain the locking member 86 in the engaged position (FIGS. 5 and 6). The engageable portion of the locking member 86 comprises a pair of deflectable spring fingers 102 that extend downwardly and laterally outwardly from opposite sides of the locking channels 100 of each U-shaped member 88 and terminate at distal laterally outwardly extending locking projections 104 spaced at a distance relatively greater than the spacing between the side walls 68, 70 of the connector 56 such that the fingers 102 are caused to be deflected inwardly toward one another as they are extended initially into the passage 78. The engageable portion of the connector 56 comprises a pair of locking recesses or undercut regions 106 provided in the side walls 68, 70 of the connector 56 directly across from one another and immediately adjacent to the location of the locking projections 104 when fully inserted into the passage 78. The undercut regions 106 are relatively greater in width than the width of the passage 78 above the regions 106 to permit the spring fingers 102 to expand outwardly displacing the locking projections 104 into position within the undercut regions 106. An abutment 108 of each region 106 faces away from the top opening 80 of the passage 78 and confronts an adjacent shoulder 110 of each displaced locking projection 104 to thereby lock the locking member 86 against subsequent removal from the passage 78.

The back wall 66 of the base portion 56 is formed with a central aperture 111 that is aligned axially with the aperture 48 of the end fitting 30 and through which the extended end 22 of the core element 18 extends.

A core element-supporting portion 112 of the connector 56 extends axially from the base portion 58 and includes a swivel tube 114 formed with a convex spherical surface or ball 116 at one end and extending therefrom to an opposite free end 118. The ball 116 is captured within a swivel socket 120 of the portion 112 defined in part by a cup-shaped insert 122 to provide a swivel joint of the general type disclosed in U.S. Pat. No. 4,380,178 to Bennett et al, incorporated herein by reference. The insert 122 can be made of an appropriate material, such as nylon, to provide a desired low friction surface for the ball 116. The swivel tube 114 and insert 122 have aligned passages or bores 124, 126 through which the extended end 122 of the core element 118 extends. The swivel tube 114 supports the extended end 22 of the core element 18 at an acute angle relative to the longitudinal axis of the connector 56. The bore 124 of the swivel tube 114 has a frustoconical end portion 128 tapering from a large diameter in the direction away from the insert 122 to the smaller diameter of the bore 124.

As illustrated in FIG. 2 the extended end of the core element 18 preferably includes a rigid cylindrical metal rod 130 that is swaged onto the core element 18 and is supported slideably within and guided by the bore 124 of the swivel tube 114, enabling the portion of the rod 130 that extends beyond the swivel tube 114 to transmit both a pushing and pulling force to a member to be actuated without support from a conduit as would be necessary if the rod 130 were flexible. The rod 130 includes an apertured end portion (not shown) adapted for attachment to a lever and may be the type disclosed in the aforementioned incorporated U.S. Pat. No. 4,380,178.

The swivel tube 114 and the cup-shaped insert 122 are preformed and subsequently united with the body 57 during an insert molding operation in conventional manner. The body 57 is formed with a frustoconical portion 132 arranged about the swivel tube 114 forwardly of the ball 116 flaring from a small diameter at the swivel joint to a larger diameter axially forward of the swivel joint to limit the degree to which the swivel tube 114 can swivel.

The connector 56 is adapted by mounting means 134 to mount the assembly 10 to support structure of a vehicle (not shown). The mounting means 134 may comprise an annular transverse abutment 136 formed on the molded body 57 adjacent the swivel tube 114 and a pair of diametrically opposed flexible legs 138 extending toward the abutment 136 in cantilevered fashion and formed as an integral part of the body 57. The legs 138 terminate at free ends that are spaced axially from the abutment 136. The legs 138 are extendible through an aperture of a plate-like support structure (not shown) enabling the free ends of the legs 138 to engage the support structure on the back side extremity of the aperture and the abutment 136 to engage the support structure on the other side of the aperture. A lug 140 projects radially from the body 57 between the legs 138 and is registrable within a radial cut-out of the aperture (not shown) to secure the connector 56 against rotation relative to the support structure.

To construct the assembly 10, the body 57 is molded about the swivel tube 114 and its insert 122 in an insert-molding operation and the locking member 86 is molded in a separate injection molding operation apart from the body 57. An appropriate length of conduit 12 is selected and provided at one end with the fitting 28 and at the other end with the end fitting 30 and O-ring 52. The end fitting 30 is preferably formed by molding the end fitting 30 directly on to the end 16 of the conduit 12 by an insert-molding operation. The core element 18 is thereafter positioned within the conduit 12 and extended through the aperture 48 of the end fitting 30, the receptacle 60 and through the aligned bores 124, 126 of the swivel tube 114 and insert 122 and then out of the swivel tube 114. The rod 130 is secured to the exposed end of the core element 18 and drawn back into the swivel tube 114. The end fitting 30 is fitted with the O-ring 52 and inserted axially into the receptacle 60 through the access opening 62 of the connector 56 until the annular ridge 44 of the end fitting 30 is seated within the annular recess 82 of the connector 56 to compress and perfect a fluid-tight rotatable seal with the O-ring 52.

The locking member 86 is thereafter inserted into the passage 78 through the top opening 80 to position the U-shaped locking channels 100 within the locking grooves 38, 40 of the end fitting 30 and bring the locking projections 104 of the locking member 86 into locking engagement with the locking recesses 106 of the connector 56 to secure both the end fitting 30 and the locking member 86 against removal from the connector 56.

The cylindrical outer shapes of the end fitting 30 and those portions of the connector 56 and locking member 86 that support or retain the end fitting 30 permit relative rotation between the connector 56 and the end fitting 30. In this way, should the conduit 12 become twisted during installation, the installer does not have to counteract the twisting to attain proper angular alignment of the mounting means 134 with the mating structure (i.e. aperture) of the support structure in order to mount the connector 56 to the support structure, as would be necessary if the connector 56 was unable to rotate relative to the conduit 12. Instead, the relative rotatability between the connector 56 and the end fitting 30 enables the installer to rotate the connector 56 about the end fitting 30 by whatever amount is necessary to attain the proper angular orientation, thereby simplifying installation of the assembly 10 and minimizing stress on the conduit 12.

Preforming the end fitting 30 and connector 56 and its locking member 86 as separate components enables better control and repeatability of the corresponding relative sizes and shapes of the components to provide proper clearance therebetween and assure that when the components are assembled, the connector 56 is able to rotate about the end fitting 30 and does not bind as a result of too little clearance or is not too loose as a result of too much clearance The disclosed embodiment is representative of the preferred form of the invention, but is intended to be illustrative rather than definitive thereof. The invention is defined in the claims.

I claim:

1. A motion transmitting remote control assembly, comprising:

a conduit (12) having opposite ends (14, 16);

a core element (18) supported slideably within said conduit (12) having extended end portions (20, 22) extending beyond said ends (14, 16) of said conduit (12);

an end fitting (30) fixed to one of said ends (16) of said conduit (12);

a connector (56) disposed about said end fitting (30) having mounting means (134) for mounting said end fitting (30) to a support structure;

said connector (56) including a receptacle (60) having an access opening (62) therein to receive and support said end fitting (30) rotatably within said receptacle (60) and retaining means (86) acting between said end fitting (30) and said connector (56) to retain said end fitting (30) against subsequent removal from said receptacle (60) while allowing relative rotation between said connector (56) and said end fitting (30) and resilient seal means (52) acting between said end fitting (30) and said connector (56) upon insertion of said end fitting (30) into said receptacle (60) for providing and maintaining a fluid-tight seal between said end fitting (30) and said connector (56) during said relative rotation of said end fitting (30) and said connector (56);

said end fitting (30) including a plurality of annular projections (32,34,36) spaced axially from one another defining at least one annular locking groove (38,40) therebetween;

said retaining means (86) comprising a locking member (86) having portions engageable with said end fitting (30), said locking member (86) being movable with respect to said connector (56) and said end fitting (30) from a disengaged position to permit insertion of said end fitting (30) into said receptacle (60) to an engaged position in which said portions of said locking member (86) engage said end fitting (30) to prevent subsequent removal of said end fitting (30) from said receptacle (60);

said locking member (86) including at least one locking channel (100) engageable with said locking groove (38, 40) when said locking member (86) is moved to said engaged position to retain said end fitting (30) against removal from said receptacle (60) through said access opening (62);

said locking member (86) and said connector (56) including mutually engageable portions that coact to lock said locking member (86) in said engaged position;

said connector (56) having a passage (78) with an opening (80) spaced from said access opening (62) and extending transversely into said receptacle (60) supporting and guiding said locking member (86) during movement toward said engaged position;

said mutually engageable portion of said locking member (86) comprising at least a pair of deflectable spring fingers (102) extending from said locking channel (100) and terminating at laterally outwardly extending locking projections (104) spaced at a lateral distance relatively greater than the lateral dimension of said passage (78).

2. The assembly of claim 1 further characterized by said seal means (52) comprising an O-ring seal (52) disposed about said end fitting (30).

3. The assembly of claim 2 further characterized by said end fitting (30) having an outer annular O-ring groove (50) and said O-ring seal (52) being disposed within said groove (50).

4. The assembly of claim 3 further characterized by said access opening (62) being generally circular and relatively larger in diameter than said annular projections (32, 34, 36) of said end fitting (30).

5. The assembly of claim 4 further characterized by an end-most one (36) of said annular projections (32, 34, 36) having said outer O-ring groove (50) formed therein.

6. The assembly of claim 5 further characterized by said O-ring seal (52) having a predetermined diameter and said connector (56) including an annular recess (82) within said receptacle (60) having a diameter relatively smaller than said diameter of said O-ring seal (52) and supporting said end-most projection (36) and said O-ring seal (52) under compression therein when said end fitting (30) is inserted fully into said receptacle (60) to perfect said fluid-tight seal between said connector (56) and said end fitting (30).

7. The assembly of claim 4 further characterized by said access opening (62) extending axially into said receptacle (60).

8. The assembly of claim 3 further characterized by one (32) of said annular projections (32, 34, 36) of said end fitting (30) being disposed within said access opening (62) when said end fitting (30) is inserted fully into said receptacle (60).

9. The assembly of claim 3 further characterized by said locking member (86) including a plurality of said locking channels (100) corresponding in number to the number of said locking grooves (38, 40) of said end fitting (30).

10. The assembly of claim 3 further characterized by said mutually engageable portion of said connector (56) comprising at least a pair of locking recesses (106) engageable with said locking projections (104) when said locking member (86) is in said engaged position.

11. A motion transmitting remote control assembly comprising a conduit (12) having opposite ends (14,16); a core element (18) supported slideably with said conduit (12) having extended end portions (20,22)extending from said ends (14,16) of said conduit (12); an end fitting (30) molded about one end (16) of said conduit (12) secured against relative axial and rotational movement relative to said conduit (12) and extending axially of said conduit (12) to a free end, said end fitting (30) including a plurality of annular projections (32, 34, 36) of predetermined diameter spaced axially from one another defining at least one annular locking groove therebetween, an end-most one (36) of said projections (32, 34, 36) being disposed on said free end of said end fitting (30) and having an outer annular O-ring groove (50) and an O-ring seal (52) of predetermined diameter disposed within said O-ring groove (50); a connector (56) formed separately from said end fitting (30) having a base portion (58) provided with a receptacle (60) and a circular access opening (62) extending axially of said connector (56) into said receptacle (60) and having a diameter relatively greater than said predetermined diameter of said annular projections (32,34,36) to enable said end fitting

(30) to be inserted therethrough from said free end thereof axially into said receptacle (60), said receptacle (60) including an annular concentric recess (82) having a diameter relatively smaller than said predetermined diameter of said O-ring seal (52) to receive and support said end-most projection (36) and said O-ring seal (52) therein when said end fitting (30) is inserted fully into said receptacle (60) to perfect a fluid-tight seal between said connector (56) and said end fitting (30) and to provide relative rotational support of said connector (56) about said end fitting (30), another one (32) of said annular projections (32, 34, 36) being disposed within said access opening (62) of said connector (56) when said end fitting (30) is inserted fully within said receptacle (60), said connector (56) including a passage (78) having an opening (80) spaced from said access opening (62) and extending transversely of said end fitting (30) into said receptacle (60), said locking groove (38, 40) being accessible in said receptacle (60) through said passage (78), said connector (56) including mounting elements to enable said connector (56) to be mounted on a support structure and including a core-supporting portion (112) extending axially from said base portion (58) and supporting and guiding said extended end portion (22) of said core element (18); and a locking member (86) having at least one U-shaped locking channel (100), said locking member (86) being insertable into said passage (78) from an initial disengaged position to allow said end fitting (30) to be inserted into said receptacle (60) to an engaged position in which said U-shaped locking channel (100) is moved into retaining engagement within said locking groove (38, 40) to preclude subsequent removal of said end fitting (30) from said receptacle (60) while maintaining said relative rotatability of said connector (56) and said end fitting (30), said locking member (86) and said connector (56) including mutually enagageable portions to lock said locking member (86) in said engaged position, said mutually engageable portion of said locking member (86) comprising a pair of deflectable spring fingers (102) extending from said U-shaped locking channel (100) to distal spaced-apart locking projections (104) and said mutually engageable portion of said connector (56) comprising a pair of opposing recesses (106) provided in said passage (78) adjacent to the location of said locking projections (104) when said locking member (86) is in said engaged position and engageable with said locking projections (104) to preclude subsequent movement of said locking member (86) out of said engaged position.

\* \* \* \* \*